Nov. 1, 1932.  A. J. MEYER ET AL  1,885,369

INTERNAL COMBUSTION ENGINE

Filed Dec. 3, 1927

INVENTORS:
André J. Meyer
Lewis P. Kalb
BY W. W. Harris
ATTORNEY.

Patented Nov. 1, 1932

1,885,369

UNITED STATES PATENT OFFICE

ANDRE J. MEYER AND LEWIS P. KALB, OF DETROIT, MICHIGAN, ASSIGNORS TO CONTINENTAL MOTORS CORPORATION, OF DETROIT, MICHIGAN, A CORPORATION OF VIRGINIA

INTERNAL COMBUSTION ENGINE

Application filed December 3, 1927. Serial No. 237,366.

This invention relates to internal combustion engines and refers more particularly to an improved cylinder and cylinder head construction.

One object of our invention resides in providing an engine of increased efficiency and of non-detonating characteristics.

In the poppet valve type of engine it is customary to locate the intake and exhaust valves to one side of the associated engine cylinder, the valve chamber also serving as a combustion chamber and having a communicating passage with the cylinder. This general type of engine has a tendency to detonate the cause of which has been the subject of considerable discussion, one theory being that the flame curtain reaches the walls of the combustion chamber substantially at the same time. We have discovered that by providing what we term an "after-burning" chamber of the character described hereinafter, the engine operates more efficiently, with more power and without detonation.

The after-burning chamber communicates with the valve combustion chamber, and is a relatively small volume of the whole combustion chamber and is a well cooled chamber. Thus the after-burning chamber overlies a portion of the piston preferably as remote as possible from the piston center which is the hottest portion of the piston face, the illustrated embodiment of our invention showing the after-burning chamber overlying a peripheral segment of the piston. The spark plug is preferably located in proximity to the exhaust valve which is desirable in avoiding detonation at this hottest portion of the valve combustion chamber. With our construction the end of the after-burning chamber is preferably comparatively remote from the valve combustion chamber and from the spark plug so that the gases contained in the after-burning chamber are fired subsequent to the burning of the gases in the valve combustion chamber. Such a remote after-burning chamber would give rise to detonation were it not sufficiently cooled to reduce the temperature at such a location below its detonating point as the pressure builds up in advance of the flame curtain from the spark plug. Our invention provides for maintaining the after-burning chamber at the desired temperature to avoid detonation and results in an engine having increased power and efficiency.

Further objects and advantages of our invention reside in the combination and arrangement of parts more particularly hereinafter described and claimed.

Figure 1:
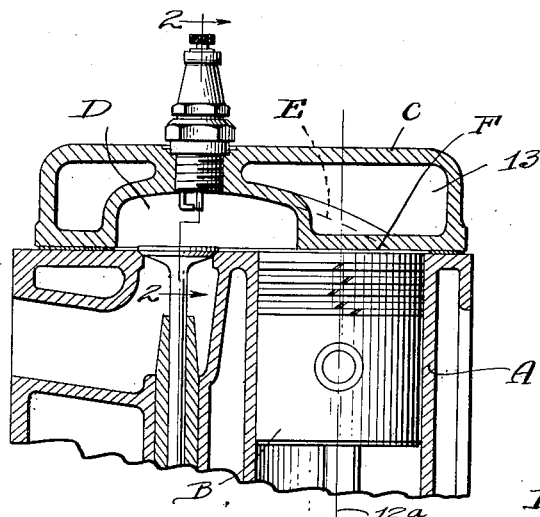
Figure 3:
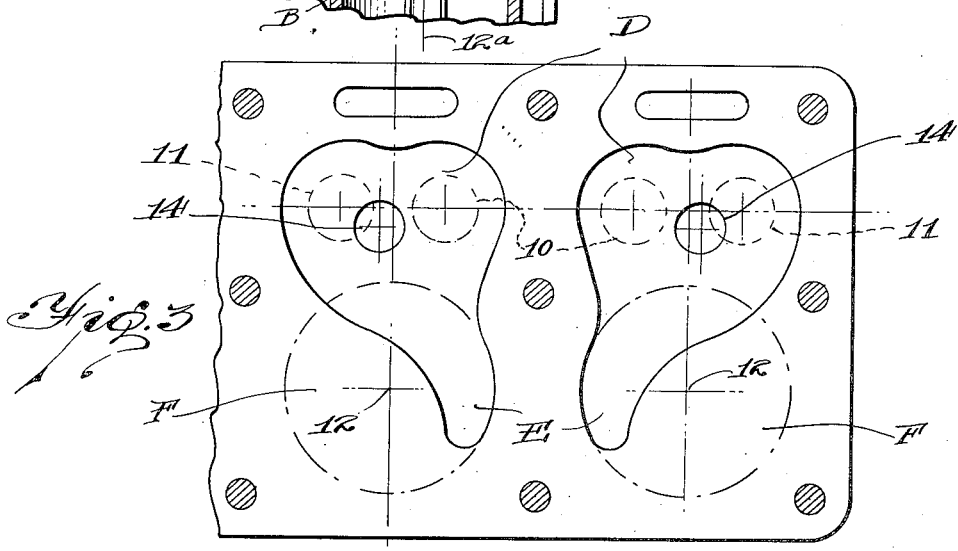
Figure 2:
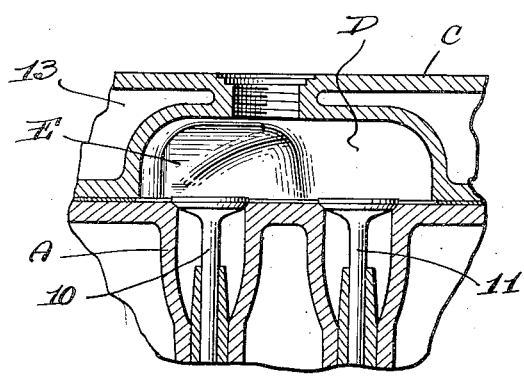

In the accompanying drawing illustrating an embodiment of our invention,

Fig. 1 is a sectional elevation view of the engine through the cylinder and valve combustion chamber thereof, Fig. 2 is a sectional elevation view through 2—2 of Fig. 1, and Fig. 3 is an inverted plan view of the cylinder head.

Referring to the drawing, reference character A represents the engine cylinder, B the piston, and C the cylinder head. Cylinder A may be provided with the usual intake and exhaust valves 10 and 11 respectively which open into the valve or primary combustion chamber D of cylinder head C. Communicating with the chamber D is an after-burning or secondary combustion chamber E, the chambers D and E comprising the total combustion chamber. The chamber E as illustrated slopes downwardly toward the piston away from the valves avoiding the piston center 12 although preferably extending therebeyond, the remaining portion F of the cylinder head above the piston and cylinder preferably providing a minimum clearance above the piston, preferably the thickness of the usual gasket 14 which is about $\frac{1}{16}$ of an inch. The cylinder head C has water jacket 13 which cools the wall F and thereby cools the piston face and the layer of gases trapped in the clearance above the piston. Such construction assists in preventing detonation in the after-burning chamber. The chamber E may follow the general curvature of the piston and cylinder avoiding the piston center or axis $12^a$. By referring to Fig. 3 it will be noted that in the embodiment illustrated the secondary chamber E extends at least to the plane containing the piston axes $12^a$.

The cylinder head has a spark plug 14 preferably located in proximity with the exhaust valve 11.

The particular arrangement of valves is relatively unimportant within keeping of the essential features of our invention, and the valves might if desired be arranged one above the other or otherwise disposed within the valve combustion chamber.

Our invention thus provides an engine having excellent turbulence, with increased power and efficiency without detonation.

Various changes may be made over the particular embodiment illustrated within the scope of our invention and we do not limit our invention except as recited in the claims.

What we claim as our invention is:

1. In an engine of the character described, a cylinder, a piston, intake and exhaust valves for the cylinder, a cylinder head provided with a primary chamber to one side of the cylinder into which said valves open and also provided with a communicating secondary chamber overlying a portion of the piston remote from the center of the piston face, a spark plug located in proximity with the exhaust valve, said secondary chamber sloping downwardly from the primary chamber to a point beyond the piston axis generally following the curvature of the piston face periphery, the cylinder head having a portion thereof providing a minimum clearance for the remainder of the piston face when the piston is in its upper limit of travel.

2. In an engine of the character described, a cylinder, a piston, intake and exhaust valves for the cylinder, a cylinder head provided with a primary chamber to one side of the cylinder into which said valves open and also provided with a communicating secondary chamber overlying a portion of the piston remote from the center of the piston face, a spark plug located in proximity with the exhaust valve, said secondary chamber sloping downwardly from the primary chamber to a point beyond the piston axis generally following the curvature of the piston face periphery, the cylinder head having a portion thereof providing a minimum clearance for the remainder of the piston face when the piston is in its upper limit of travel, and cooling means for the minimum clearance of the cylinder head.

In witness whereof, we hereunto subscribe our names this 30th day of November, A. D. 1927.

ANDRE J. MEYER.
LEWIS P. KALB.